US012809649B1

United States Patent

(12) United States Patent
Selvam

(10) Patent No.: US 12,809,649 B1
(45) **Date of Patent: *Nov. 24, 2026**

(54) ADAPTIVE USER INTERFACE ACCESSIBILITY REMEDIATION

(71) Applicant: U.S. Bank National Association, Minneapolis, MN (US)

(72) Inventor: Muthu Selvam, Huntersville, NC (US)

(73) Assignee: U.S. Bank National Association

(*) Notice: Subject to any disclaimer, the term of this patent is extended or adjusted under 35 U.S.C. 154(b) by 0 days.

This patent is subject to a terminal disclaimer.

(21) Appl. No.: 19/558,967

(22) Filed: Mar. 6, 2026

Related U.S. Application Data

(63) Continuation of application No. 19/362,375, filed on Oct. 18, 2025, now Pat. No. 12,632,271.

(51) Int. Cl.
*G06F 9/451* (2018.01)

(52) U.S. Cl.
CPC .................................... *G06F 9/451* (2018.02)

(58) Field of Classification Search
CPC ....... G06F 9/451; G06F 3/0484; G06F 3/0483
See application file for complete search history.

(56) References Cited

U.S. PATENT DOCUMENTS

2020/0372205 A1* 11/2020 Bradley ................ G06F 40/134
2022/0129123 A1* 4/2022 Nair .......................... G06F 8/38
2024/0152671 A1* 5/2024 Lee ......................... G06F 30/27
2025/0126152 A1* 4/2025 Wiggins ................ G06F 16/285

OTHER PUBLICATIONS

Luis Aguas-Bucheli et al., Kamezil: Secure and Accessible Browser for Novice Users, Jun. 18, 2025, International Conference on eDemocracy & eGovernment, pp. 145-151 (Year: 2025).*
Advait Thakur et al., An Accessibility-First Framework for Enhancing Web Experiences of People with Disabilities, Aug. 22, 2025, International Conference on Computing—Communication—Control and Automation, pp. 1-7 (Year: 2025).*
Mozilla, Mutation Observer, Oct. 11, 2025, https://developer.mozilla.org/en-US/docs/Web/API/MutationObserver.

(Continued)

*Primary Examiner* — Tam T Tran
(74) *Attorney, Agent, or Firm* — Garg Law Firm, PLLC; Rakesh Garg; Christopher Davis

(57) ABSTRACT

A rendering event is detected during a rendering cycle of a user interface (UI) being rendered on a device. In response to the detection, monitoring is initiated of a data structure containing a set of elements of the UI. From the monitoring, an element in the set of elements is detected to include a violation of an accessibility requirement. A classification of the violation is generated, which includes one or more from a set including a type, a severity, and a priority of the violation. A remedy corresponding to the violation and the classification is selected and a modification of data of the element in the data structure in a memory of the device is performed in real time during the rendering cycle to form a corrected element, correcting the violation of the element. The UI is rendered with the corrected element during the rendering cycle.

18 Claims, 12 Drawing Sheets

(56) References Cited

OTHER PUBLICATIONS

Mozilla, Accessibility Tree, Oct. 11, 2025, https://developer.mozilla.org/en-US/docs/Glossary/Accessibility_tree.
Mozilla, The Html Dom Api, Oct. 11, 2025, https://developer.mozilla.org/en-US/docs/Web/API/HTML_DOM_API.
Oracle, What is A/B testing?, Oct. 11, 2025, https://www.oracle.com/cx/marketing/what-is-ab-testing/.
Open AI Platform, Speech to text, Oct. 11, 2025, https://platform.openai.com/docs/guides/speech-to-text.
Google Cloud, Turn speech into text using Google Al, Oct. 11, 2025, https://cloud.google.com/speech-to-text?hl=en.
W3C, Web Content Accessibility Guidelines (WCAG) 2.1, W3C Recommendation, May 6, 2025, https://www.w3.org/TR/WCAG21/.
Microsoft Azure, Azure AI Speech, Oct. 16, 2025, https://azure.microsoft.com/en-US/products/ai-services/ai-speech.
AWS, Amazon Transcribe, Oct. 16, 2025, https://aws.amazon.com/transcribe/.
Google Cloud, Vision AI—Extract insights from images, documents, and videos, Oct. 16, 2025, https://cloud.google.com/vision?hl=en.
Microsoft Azure, Azure AI Vision, Oct. 16, 2025, https://azure.microsoft.com/en-US/products/ai-services/ai-vision.
W3C, WAI-ARIA Overview, Oct. 16, 2025, https://www.w3.org/WAI/standards-guidelines/aria/.
Apple Developer, Accessibility API, Oct. 16, 2025, https://developer.apple.com/documentation/accessibility/accessibility-api.
Android Developers, Accessibility Service, Oct. 16, 2025, https://developer.android.com/reference/android/accessibilityservice/AccessibilityService.
Deque Systems, Axe accessibility testing tools are the best on the planet, Oct. 16, 2025, https://www.deque.com/axe/.
Chrome for Developers, Lighthouse, Oct. 16, 2025, https://developer.chrome.com/docs/lighthouse/.
Elastic, Elasticsearch, Oct. 16, 2025, https://www.elastic.co/elasticsearch.
Splunk, Accelerate value with 2,000+ integrations, apps, and add-ons, Oct. 16, 2025, https://www.splunk.com/.
Quantum Metric, No More Analytics, Oct. 16, 2025, https://www.quantummetric.com/.

* cited by examiner

700

800

ADAPTIVE USER INTERFACE ACCESSIBILITY REMEDIATION

RELATED APPLICATION

The present application is a CONTINUATION of U.S. patent application Ser. No. 19/362,375, titled ADAPTIVE USER INTERFACE ACCESSIBILITY REMEDIATION and filed on Oct. 18, 2025.

BACKGROUND

People interact with digital products using a variety of graphical user interfaces (GUIs, UIs, or interfaces) on a variety of devices and modalities. Some users rely on eye-tracking, others on screen readers or magnifiers, and many switch between devices such as desktop computers, laptops, tablets, or smartphones for a variety of accessibility features scattered across platforms. Because different users has different ways of perceiving and interacting with content, designers must provide alternatives where visual or motor cues are insufficient. For example, a user who cannot read the visual color contrast may depend on a screen reader that reads aloud the text. A user with limited motor control may use voice input or a single-handed keyboard. If a website or application fails to provide alternate text for images, proper focus order for keyboard navigation, or accessible roles for custom controls, these users cannot understand or use the interface.

Regulators in many jurisdictions impose legal requirements for accessibility. In the United States the Americans with Disabilities Act (ADA), Section 508 of the Rehabilitation Act, and the Web Content Accessibility Guidelines (WCAG) 2.1 and 2.2 set standards that public-sector and private-sector websites and applications must meet. In the European Union the Web Accessibility Directive requires that public sector services be easily usable by people with disabilities. Failure to comply can lead to legal and financial consequences. Consequently, organizations must test their interface designs against these standards and correct any violations.

Digital platforms increasingly serve diverse users, many of whom rely on assistive technologies such as screen readers, magnifiers, or voice command tools. Existing solutions typically analyze static HyperText Markup Language (HTML) markup at build time and produce a report of potential WCAG violations. However, dynamic content, for example, JavaScript-generated widgets, third-party embedded modules, or client-side state changes, often escapes detection until runtime. This gap leaves many accessibility issues unaddressed for end users, reducing usability and exposing operators to compliance risk.

Compliance with various accessibility requirements are collectively referred to herein as simply "compliance"; and compliance issues can arise from government regulations as well as private, corporate, policy, or other requirements. Conversely, a non-compliance with an accessibility requirement of any type is collectively referred to herein as a "violation".

Many modern user interfaces are built from component libraries that change the Document Object Model (DOM) or native accessibility tree while the application is running. Presently available technologies that provide this capability include REACT (by META), ANGULAR (by GOOGLE), VUE.JS (by Yuxi (Evan) You and the Vue community), and the native user-interface toolkits of ANDROID (by Google) and IOS (by APPLE) and some others.

These products and technologies are engineered to render or update UI markup on the fly, whether through virtual-dom diffing, two-way data binding, or reactive references. Likewise, frameworks that address the UI needs in a desktop environment include ELECTRON (by the OPENJS FOUNDATION), .NET (by MICROSOFT) and its WINDOWS PRESENTATION FRAMEWOK (by MICROSOFT) or .NET Multi-Platform App UI (owned by MICROSOFT), and Qt (by THE QT COMPANY). Some of these technologies bridge other technologies or provide rich native widget frameworks to create full-featured applications that run on WINDOWS, MACOS, ANDROID, and IOS.

SUMMARY

The present disclosure includes inventive concepts relating generally to modifying code for a graphical user interface, such as methods, systems, and computer programs for adaptive user interface accessibility remediation. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method embodiment includes detecting, in a rendering cycle, a rendering event corresponding to a user interface (UI) being rendered on a device. The embodiment further includes initiating, responsive to the detecting, monitoring of a data structure containing a set of elements of the UI. The embodiment further includes detecting, responsive to the monitoring, that an element in the set of elements comprises a violation of an accessibility requirement. The embodiment further includes generating a classification of the violation, the classification comprising at least one of a type, a severity, and a priority of the violation. The embodiment further includes selecting a remedy corresponding to the violation and the classification. The embodiment further includes modifying in real time during the rendering cycle, as a part of applying the remedy, data of the element in the data structure in a memory of the device to form a corrected element, the corrected data correcting the violation of the element. The embodiment further includes causing the UI to be rendered with the corrected element during the rendering cycle.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

At least some novel features believed characteristic of examples of inventive concepts disclosed herein are set forth in the appended claims. The inventive concepts of the instant application, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
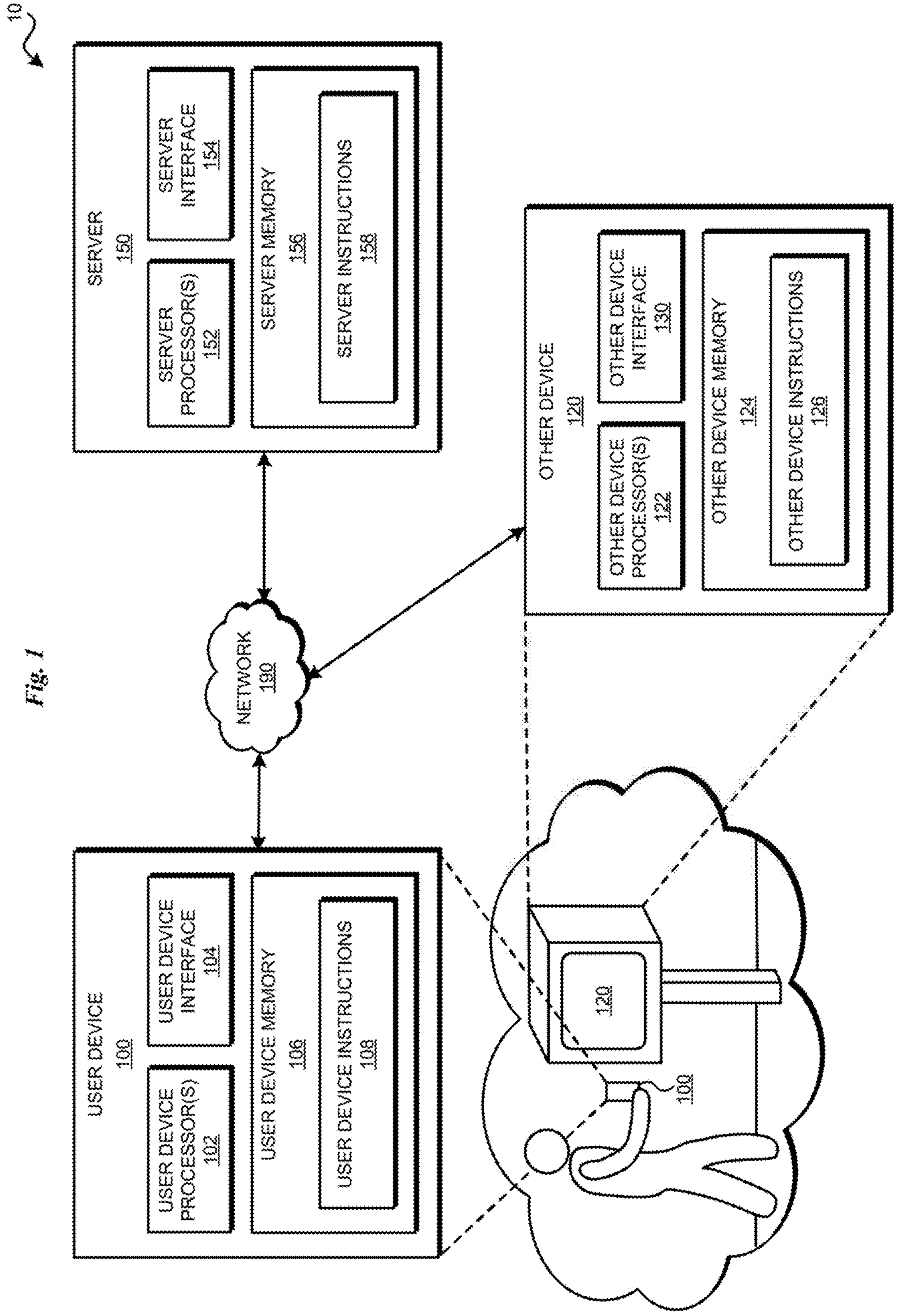
FIG. 1 depicts a block diagram of a computing environment in which an illustrative embodiment may be implemented.

The illustrative embodiments recognize that accessibility compliance related problems are common in modern digital apps. Rapid UI changes in dynamic frameworks such as React, Angular, and Vue dynamically create new issues that cannot be corrected by those tools. Third-party widgets, like date pickers, charts, and modal dialogs, often result in non-compliant UI. Accessibility audits are usually manual and static, which delays violation detection and leaves gaps. These problems exclude high-risk users including the visually impaired, hearing impaired, and neurodiverse people from critical services such as banking, healthcare, and government portals.

The illustrative embodiments recognize that presently available technologies that generate or modify the interface at runtime, leave open, or even create the opportunity for accessibility violations. For example, insufficient color contrast, missing or incorrect Accessible Rich Internet Applications (ARIA) roles, compromised reading order, or keyboard traps, are some types of problems that arise at the time a component mounts, a lazy-loaded module resolves, or an external widget is injected.

On mobile platforms, the accessibility Application Programming Interfaces (APIs) exposed by various operating systems enable developers to assign content descriptions, traits, and custom actions to native widgets. Yet, the illustrative embodiments recognize that these APIs rely entirely on the application ("app") to supply accurate metadata, which leads to unintended and dynamically occurring accessibility problems. For example, when an image or component materializes after asynchronous data fetching, it may arrive without an appropriate alt text or semantics, and the operating system offers no built-in mechanism for "patching" the omission on the fly. Similar limitations apply to desktop technologies. For example, the illustrative embodiments recognize that certain native UI frameworks can dynamically reconfigure component hierarchies, but their standard toolchains and inspectors do not provide a continuous, runtime remediation capability (adaptive accessibility remediation, or adaptive remediation).

The illustrative embodiments recognize that the prevailing compliance workflow is largely a static, such as build-time check performed by tools like AXE (by DEQUE SYSTEMS), LIGHTHOUSE (by GOOGLE), or browser-built accessibility inspectors. The illustrative embodiments recognize that these types of scanners observe the DOM only after it has been rendered and frozen for the purpose of analysis. The illustrative embodiments recognize that the presently available techniques are incapable and unable to detect violations that manifest during subsequent state changes, nor can they automatically insert the necessary corrective markup. Consequently, the illustrative embodiments recognize that presently, developers are compelled to manually review code, re-render pages, or release new builds whenever UI logic changes, a process that is both time-consuming and error-prone.

The illustrative embodiments recognize that the modern, component-centric development landscape creates a persistent gap between the dynamically evolving user interface and the static compliance checks that dominate current practice. The illustrative embodiments recognize that a need exists for a self-healing, runtime accessibility engine that observes, classifies, and corrects violations as they occur across web, mobile, and desktop environments. The present disclosure addresses these deficiencies and needs by providing a method, apparatus, system, and application for adaptive user interface accessibility remediation. The illustrative embodiments improve the present state of the art technology for accessibility compliance in dynamic UI presentation, as described herein.

The following is a description of a specific example implementation of the proposed architecture according to one embodiment. The description of the implementation illustrates the principle of operation of the embodiment using certain example use cases, example data, and corresponding results from the proposed architecture. All trademarks related to any specifically named examples, uses, characters, entities, values, numbers, limits, tools, techniques, models, steps, and operations described or referenced herein belong to their respective owners. The specific examples, uses, characters, entities, values, numbers, limits, tools, techniques, models, steps, and operations are not intended to be limiting. From this disclosure, those of ordinary skill in the art will be able to conceive many other variations of these description artifacts and the same are contemplated within the scope of the illustrative embodiments. The description of the implementation is as follows—

The Adaptive Accessibility Remediation Engine (AARE) is a runtime system designed to continually monitor a user interface and automatically correct accessibility violations as they occur, thereby eliminating the need for manual code changes or redeployment. The system enables real-time runtime remediation that ensures accessibility compliance even when UIs evolve dynamically.

Depending on the platform where it is deployed, the proposed system can run as a frontend middleware agent-such as JavaScript Software Development Kit (SDK) for web browser based interfaces, a lightweight library for apps on mobile platforms, as extensions, plugins, or embedded classes for applications in desktop environments. The architecture of the system can be integrated into existing build pipelines at code development stage or injected dynamically at runtime rendering of the UI.

At execution, the system can be integrated into the application that is rendering the UI or can be loaded as a runtime overlay. Some non-limiting examples of the overlays include browser extensions, mobile accessibility services. The system is compatible with the frameworks currently in existence, such as with REACT, ANGULAR, VUE, native ANDROID/IOS, and desktop frameworks such as ELECTRON, .NET, and QT.

The architecture initiates its operation by deploying a runtime monitoring module that watches for modifications to the DOM or the native accessibility tree, utilizing mutation observers and platform-specific APIs to detect when elements are added, removed, or altered in a UI presentation or when there is a state change in the UI. The monitoring module's detection mechanism is configured to detect violations such as missing semantic tags—e.g., aria-label or alt text or a role, non-compliant color contrast ratios, improper keyboard focus traps, screen reader order mismatches as compared to the logical flow of the UI, and many others. The monitoring module maintains a data structure in the form of a violation event queue for each render cycle of a given UI.

A detected violation triggers an event that is forwarded to an issue classifier. The issue classifier is a hybrid rules-based+Machine Learning (ML) classifier. The rules based component of the issue classifier applies deterministic WCAG checks, such as verifying color contrast ratios, ensuring required ARIA attributes are present, and detecting focus traps.

The ML classifier employs a model trained on a corpus of annotated UI snapshots to capture more nuanced, context-dependent violations that elude static checks. Some examples of such violations include but are not limited to distinguishing between and classifying image data on a UI as decorative or informative, determining a semantic ordering where none is either expressly provided or obvious from the UI. The issue classifier takes as input the data in the violation event queue, and outputs a type, severity, remediation priority, or some combination of these and other similar aspects associated with an issue identified in the queue.

The classification result is sent to a remediation planner module. The remediation planner implements a policy engine that is configured to map an issue classifier output for a violation to a corrective action based on a repository of compliance policies (implemented as rules), the severity of the issue, and the contextual data of the UI component. Depending on the policy decision, a "Fix Executor" component executes the chosen remediation operation corresponding to the violation. For example, the fix executor may insert missing 'aria-label' attributes, generate and insert captions or transcript using a transcription service API, adjust the tab index and focus state dynamically, replace non-compliant UI widgets with accessible overlays, adjust CSS properties to satisfy contrast requirements, or generate alternative text for an image by invoking a an API of a vision-capable AI model. These examples of corrections are not intended to be limiting. From this disclosure, those of ordinary skill in the art will be able to conceive many other accessibility violation corrections and the same are contemplated within the scope of the illustrative embodiments.

Some examples of transcription service APIs that are usable in the described manner include but are not limited to, the fix executor integrating speech-to-text APIs (e.g., as available from cloud services providers, such as GOOGLE CLOUD Speech-to-Text from GOOGLE, MICROSOFT AZURE SPEECH SERVICES from AZURE, AMAZON TRANSCRIBE in AWS) to transcribe audio/video content into captions and support real-time and batch transcription. As another example, the fix executor can automatically inject <track> elements or overlays transcripts for media lacking accessibility metadata.

Similarly, an embodiment may use vision services in the following example non-limiting manner-Use cloud-based vision APIs (GOOGLE VISION, AZURE COMPUTER VISION, AWS) to classify images and generate semantic alt text. Automatically remediate <img> elements missing descriptive attributes. In an embodiment, available vision AI APIs can be used to perform image classification, object detection, OCR, and generate semantic descriptions for images. Some examples of such APIs include GOOGLE CLOUD VISION API, MICROSOFT AZURE COMPUTER VISION. An example use case in AARE is as follows—For <img> elements missing alt text data, an embodiment uses a Vision API to analyze image content. The API returns a description such as, "A person holding a credit card", which the embodiment injects as alt text attribute via DOMPatch.

It is possible that two violation corrections may stand in conflict of one another. In such a situation, or generally when a choice between violation corrections has to be made, the fix executor uses a variety of selection methods. One method uses the priority information associated with the violations in the queue to determine which of the corrections should be applied. Another method uses the severity information from the queue to make the same determination. Another method uses a level of compliance requirement (e.g., WCAG level 1, 2, or 3 compliance) which could eliminate a correction from a choice. Another method uses a user preference to determine which correction to apply and which to forego. These examples of correction choice mechanisms are not intended to be limiting. From this disclosure, those of ordinary skill in the art will be able to conceive many other methods to resolve correction conflicts and the same are contemplated within the scope of the illustrative embodiments.

In one embodiment, a correction is encoded as a UI DOM patch and is applied directly to the live interface DOM via a DOM API without recompilation or source alteration, preserving the original application logic. In one example implementation, an embodiment uses W3C-standard DOM Mutation Observers to track real-time changes in the UI structure. It detects added, removed, or modified elements and attributes (e.g., aria-label, alt) enabling dynamic tracking of UI components without requiring page reloads. In an example use-case, the embodiment detects when a non-compliant widget (e.g., modal without focus trap) is rendered and triggers the Issue Classifier to evaluate accessibility violations.

In another embodiment, a correction is injected into the UI via virtual DOM diffing mechanism. In another embodiment, the correction is performed on the fly using an accessibility injection API. In any case, the fix executor uses shadow DOM encapsulation method to ensure any injected corrected does not cause inconsistencies in the original code of the UI.

Generally, an embodiment leverages accessibility tree APIs and DOMPatch to interface with screen readers and assistive technologies, inject ARIA attributes (aria-live, aria-describedby, aria-hidden) and correct semantic roles. It dynamically adjusts tabIndex and reading order to ensure screen reader compatibility. This allows an embodiment to perform inspection and modification of the accessibility tree.

In an example use-case, an embodiment automatically adds missing ARIA roles to buttons, modals, and form elements, and reorders accessibility tree to match logical reading flow.

Following the application of a fix, a Post-Fix Validator component rescans the modified UI to confirm that the violation has been resolved and that no additional accessibility flaws have been introduced. A "no regression" testing is implemented in this component to check whether a fix for one violation has reversed, negated, inserted a defect in, or otherwise adversely affected or regressed another fix for another violation. If a regression is discovered, the component adds the regressed defect to the violation event queue and the corrective process repeats for the regressed defect.

In one embodiment, the post-fix validator component is implemented as a lightweight accessibility scan of the remediated UI. A/B test of patched UI vs. baseline captures pre- and post-remediation snapshots using DOM serialization and accessibility tree export. It uses WCAG-based scoring engines (e.g., axe-core, Lighthouse) to compare usability and detect regressions. Some example operations of an embodiment for this purpose includes but are not limited to—Pre-Fix Snapshot: Captured using DOM serialization and accessibility tree export; Post-Fix Snapshot: Captured after remediation is applied; Comparison Engine: Uses accessibility scoring algorithms (e.g., WCAG compliance metrics), measures delta in usability, screen reader traversal, and keyboard navigation.

An example use case in AARE using an embodiment is as follows: the validator module runs A/B tests to ensure that no regressions are introduced, and that the fixes improve accessibility without breaking functionality. A/B testing technique is used to compare two versions of a feature, interface, or system behavior Version A (baseline) and Version B (modified)—to determine which performs better based on defined metrics. In AARE accessibility remediation, A/B testing is used to validate fixes by comparing the original UI against the patched version, measure improvements in usability, screen reader compatibility and keyboard navigation, and ensure no regressions are introduced during live remediation. The validator is therefore a useful part of post-fix validation and continuous learning workflows.

A Multi-Sensory Feedback Layer component adds additional or redundant accessibility features—such as audio signals, haptic feedback, or visual indicators—to reinforce the UI accessibility for users with diverse sensory needs that the interface has been corrected. The specific feature is created or obtained using a corresponding API, e.g., from a text-to-speech audio generation model, or haptic encoder, or CSS animator.

A learning engine component aggregates the remediation logs and user interactions, and trains a reinforcement-learning model that predicts future violations based on observed patterns. This predictive capability enables the system to preemptively patch UI elements before a violation occurs, thereby maintaining continuous compliance even as the interface evolves.

In one example implementation, the learning engine builds a data pipeline that moves events from Kafka or EventHub into storage and then into an ML pipeline. Reinforcement-learning models are used to select the best remediation strategy. The workflow collects remediation logs, user overrides, and telemetry. These data feed into the training routine. After training, the model predicts which issues are likely to occur before a page is rendered. Policy configurations are then updated dynamically based on those predictions. As usage increases, the engine becomes smarter and shifts from a reactive approach to a predictive one.

In another example implementation, the learning engine builds a data pipeline that ingests remediation logs, user overrides, and telemetry through either APACHE KAFKA or AZURE EVENT HUB. The raw events are written to a durable, schema-enforced storage layer such as AMAZON KINESIS DATA STREAMS, AZURE BLOB STORAGE, or a CASSANDRA-based log table. From these streams, a feature store pulls fields like component type, violation frequency, and remediation success and converts them into dense vectors that are persisted in a vector database such as FAISS or PINECONE. The core model is a reinforcement-learning policy built in TENSORFLOW-Extended or PYTORCH; it uses a policy-gradient algorithm such as Proximal Policy Optimization (PPO) to learn which remediation strategy yields the highest compliance reward. Training jobs run on a Kubernetes cluster that supplies GPUs and autoscaling to process batches of hundreds of thousands of events each night. After training, the final model checkpoint is uploaded to AMAZON S3 or AZURE BLOB and fetched by an inference service that exposes predictions through a gRPC endpoint. Policy configurations are stored in a fast, in-memory cache like REDIS or a configuration store such as ETCD; the inference service writes new policy rules back to this store via a REST API. Because the model is retrained each cycle, the engine becomes progressively better at predicting likely issues before rendering, allowing proactive remediation instead of a purely reactive approach.

Every detection, decision, remediation, and validation step is recorded in an immutable audit trail; this trail can optionally be written to a tamper-evident ledger to satisfy regulatory and compliance requirements. In one example implementation, the audit and compliance store that performs this function is built with a NoSQL database such as MONGODB or ELASTICSEARCH to keep detailed logs. For industries that require absolute auditability, an immutable storage option based on a blockchain ledger can be added. The store captures every remediation event, including what was fixed, when it happened, why it was triggered, and how the fix was applied. Auditors can consult this store to verify compliance without having to replay user sessions. The store presents standard REST and GraphQL interfaces so that reporting tools, dashboards, and audit workflows can query the log data.

End of example implementation description.

FIG. 1 depicts a block diagram of a computing environment in which an illustrative embodiment may be implemented and in which one or more devices can benefit from techniques described herein. The computing environment, labeled and referred to as system 10, includes user device 100, other device 120, and server 170 connected to a network. System 10 is configured to load and execute at least some of the computer code involved in performing the inventive methods, such as server instructions 158, which include the server-side computer program instructions of an embodiment, user device instructions 108, which include the user device-side computer program instructions of an embodiment, and other device instructions 126, which include the other device-side computer program instructions of an embodiment, as may be needed to perform the dynamic adaptation of identity related user interface.

User device 100 is a device used by a user that can be used as part of processes described herein. User device 100 can include one or more aspects described elsewhere herein such as in reference to computing environment 1100 of FIG. 11. In many examples, user device 100 is a personal computing device, such as a smart phone, tablet, laptop computer, or desktop computer. But device 100 need not be so limited and may instead encompass other devices used by a user as part of processes described herein. In the illustrated example, user device 100 can include one or more user device processors 102, one or more user device interfaces 104, and user device memory 106, among other components.

The one or more user device processors 102 are one or more components of user device 100 that execute instructions, such as instructions that obtain data, process the data, and provide output based on the processing. The one or more user device processors 102 can include one or more aspects described below in relation to the one or more processors 1112 of FIG. 11.

The one or more user device interfaces 104 are one or more components of user device 100 that facilitate receiving input from and providing output to something external to user device 100. The one or more user device interfaces 104 can include one or more aspects described below in relation to the one or more interfaces 1118 of FIG. 11.

User device memory 106 is a collection of one or more components of user device 100 configured to store instructions and data for later retrieval and use. User device memory 106 can include one or more aspects described below in relation to memory 1114 of FIG. 11. As illustrated, user device memory 106 stores user device instructions 108 and other suitable user device code.

User device instructions 108 are a set of instructions that, when executed by one or more of the one or more user device processors 102, cause the one or more user device processors 102 to perform an operation described herein. In examples, instructions 108 can be those of a mobile application (e.g., that may be obtained from a mobile application store, such as the APPLE APP STORE or the GOOGLE PLAY STORE). The mobile application can provide a user interface for receiving user input from a user and acting in response thereto. User interface 104 can further provide output to the user. In some examples, client instructions 108 are instructions that cause a web browser of user device 100 to render a web page associated with a process described herein. The web page may present information to the user and be configured to receive input from the user and take actions in response thereto.

Other device 120 may be a self-service kiosk, a computer terminal, a dedicated transactions terminal—such as an electronic payment terminal, an automated customer interaction machine or device—such as an Automated Teller Machine (ATM), and the like.

In the illustrated example, other device 120 includes one or more other device processors 122, other device memory 124, and other device interface 130.

The one or more other device processors 122 are one or more components of other device 120 that execute instructions, such as instructions that obtain data, process the data, and provide output based on the processing. The one or more other device processors 122 can include one or more aspects described below in relation to the one or more processors 1112 of FIG. 11.

Other device memory 124 is a collection of one or more components of other device 120 configured to store instructions and data for later retrieval and use. Other device memory 120 can include one or more aspects described below in relation to memory 1114 of FIG. 11. Other device memory 120 can store other device instructions 126.

Other device instructions 126 are instructions that, when executed by the one or more processors 122, cause the one or more processors 122 to perform one or more operations described elsewhere herein.

The one or more other device interfaces 130 are one or more components of other device 120 that facilitate receiving input from and providing output to something external to other device 120. The one or more other device interfaces 130 can include one or more aspects described below in relation to the one or more interfaces 1118 of FIG. 11.

Server 150 is a server device that functions as part of one or more processes described herein. In the illustrated example, server 150 includes one or more server processors 152, one or more server interfaces 154, and server memory 150, among other components.

The one or more server processors 152 are one or more components of server 150 that execute instructions, such as instructions that obtain data, process the data, and provide output based on the processing. The one or more server processors 152 can include one or more aspects described below in relation to the one or more processors 1112 of FIG. 11.

The one or more server interfaces 154 are one or more components of server 150 that facilitate receiving input from and providing output to something external to server 150. The one or more server interfaces 154 can include one or more aspects described below in relation to the one or more interfaces 1118 of FIG. 11.

Server memory 150 is a collection of one or more components of server 150 configured to store instructions and data for later retrieval and use. Server memory 150 can include one or more aspects described below in relation to memory 1114 of FIG. 11. Server memory 150 can store server instructions 158.

Server instructions 158 are instructions that, when executed by the one or more processors 152, cause the one or more processors 152 to perform one or more operations described elsewhere herein.

Network 190 is a set of devices that facilitate communication from a sender to a destination, such as by implementing communication protocols. Example networks 190 include local area networks, wide area networks, intranets, and the Internet.

Figure 2:
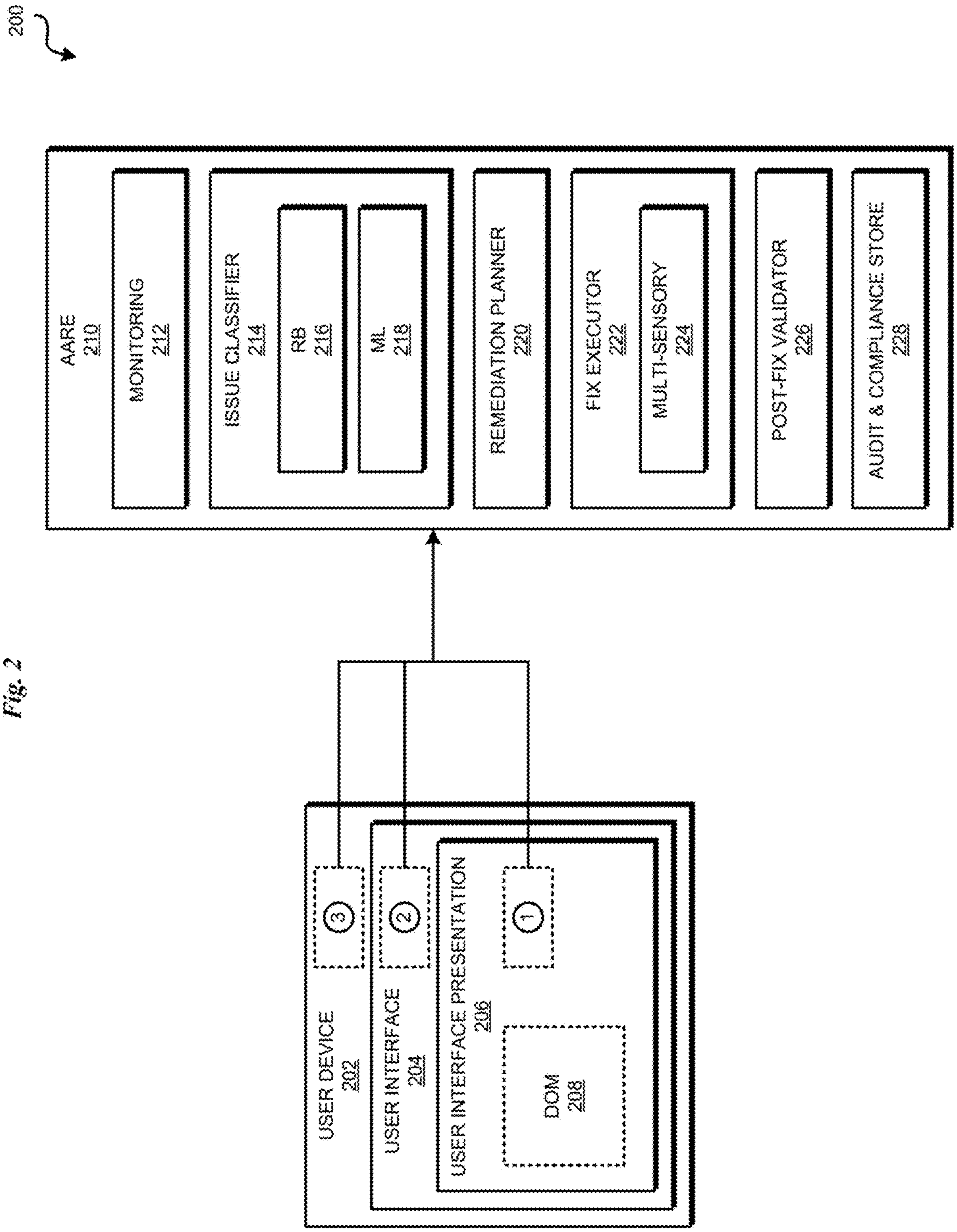
FIG. 2 depicts a configuration in which an AARE according to the illustrative embodiments can be operated.

FIG. 2 depicts a configuration in which an AARE according to the illustrative embodiments can be operated. User device 202 is an example of user device 100 in FIG. 1. User interface 204 is an example of user device interface 104 in FIG. 1.

User interface presentation is a UI that is presented by an application through with a user can interact with the application, and which is subject to accessibility requirements as described herein. UI presentation 206 includes DOM 208 with which AARE 210 according to an embodiment interacts.

AARE 210 can be configured in a variety of manners as described earlier. For example, AARE 210 can be configured at UI presentation level in an embedded manner, shown as position 1; at the user device interface level such as a browser extension, shown as position 2; at the user device level such as a lightweight library, shown as position 3.

AARE 210 includes monitoring component 212 which operates as described herein and maintains a violation event queue based on UI presentation 206, DOM 208, or some combination thereof. Issue classifier 214 includes rules-based subcomponent 216 and an ML component 218 and operates as described herein. Remediation planner component 220 uses the queue from monitoring component 212 to plan the corrections. Fix executor 222, including multi-sensory layer 224 perform the corrections as described herein. Post-fix validator 226 and audit and compliance store 228 perform their respective functions as described herein.

A local or remote learning engine (not shown) optionally operates in conjunction with AARE 210.

Figure 3:
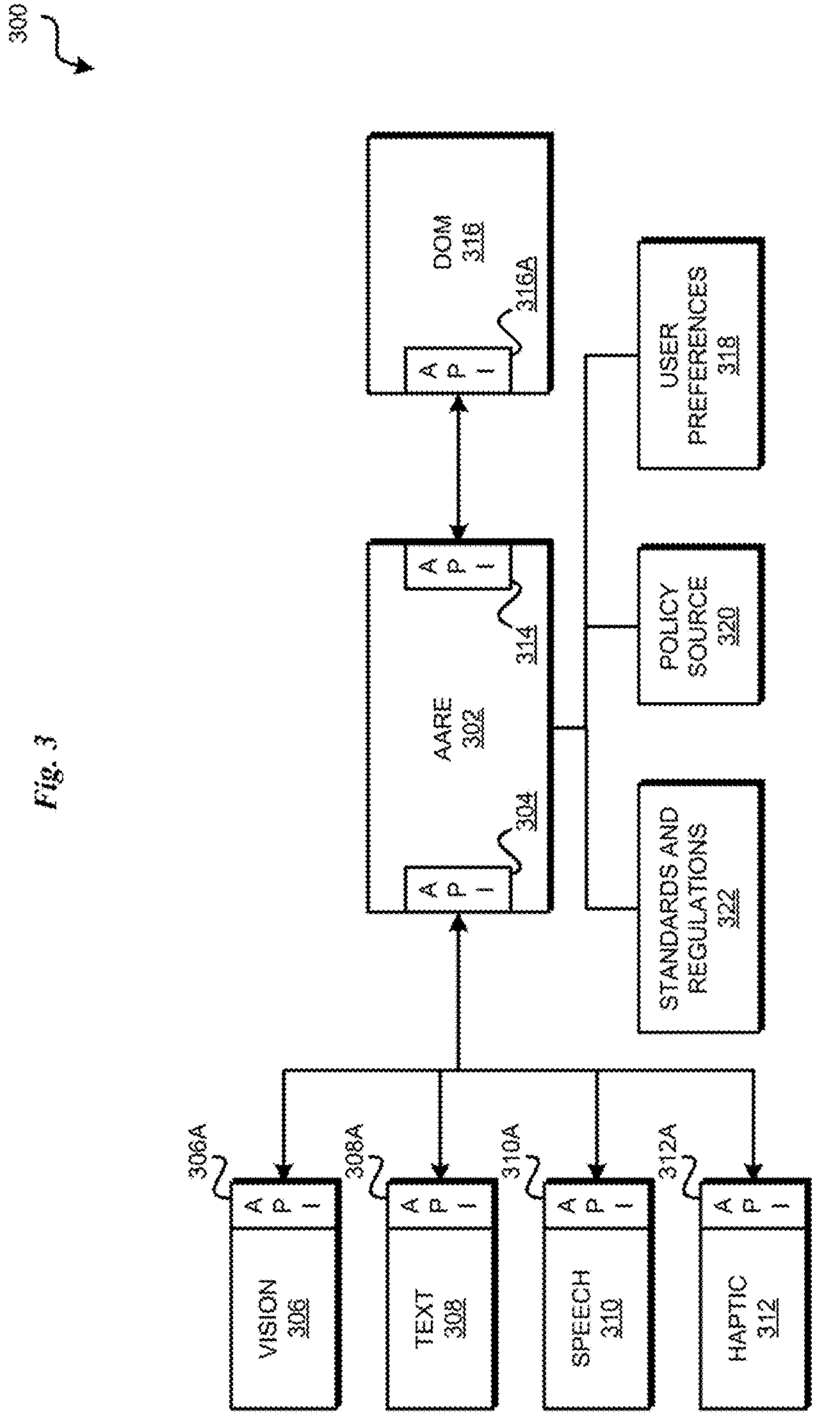
FIG. 3 depicts the various integrations of an AARE in accordance with the illustrative embodiments.

FIG. 3 depicts the various integrations of an AARE in accordance with the illustrative embodiments. AARE 302 is an example of AARE 210 in FIG. 2. AARE 302 includes API 304, which may be a library of more than one APIs for interfacing with a variety of external services and tools. For example, AARE 302 may integrate a vision capable model or service 306 via their corresponding API 306A. AARE 302 may integrate a text generation model or service 308 via their corresponding API 308A. AARE 302 may integrate a text-to-speech model or service 310 via their corresponding API 310A. AARE 302 may integrate a haptic sensory signal generator model or service 312 via their corresponding API 312A. Any number of these and other services for assisting in adding or correcting an accessibility feature can be similarly integrated with AARE 302. AARE 302 interfaces with DOM 316 of a UI presentation via API 316A implemented with the DOM architecture.

A variety of other repositories and services can be integrated in other manners. For example, AARE 302 interfaces with user preferences repository 318 which may exist on the user device or somewhere else over a data network. Policy source 320 may similarly be local or remote for use with, for example, remediation planner component 220 in FIG. 2. Standards and regulations, such as WCAG and others, can be obtained via an interface or data communication with external repository.

Figure 4:
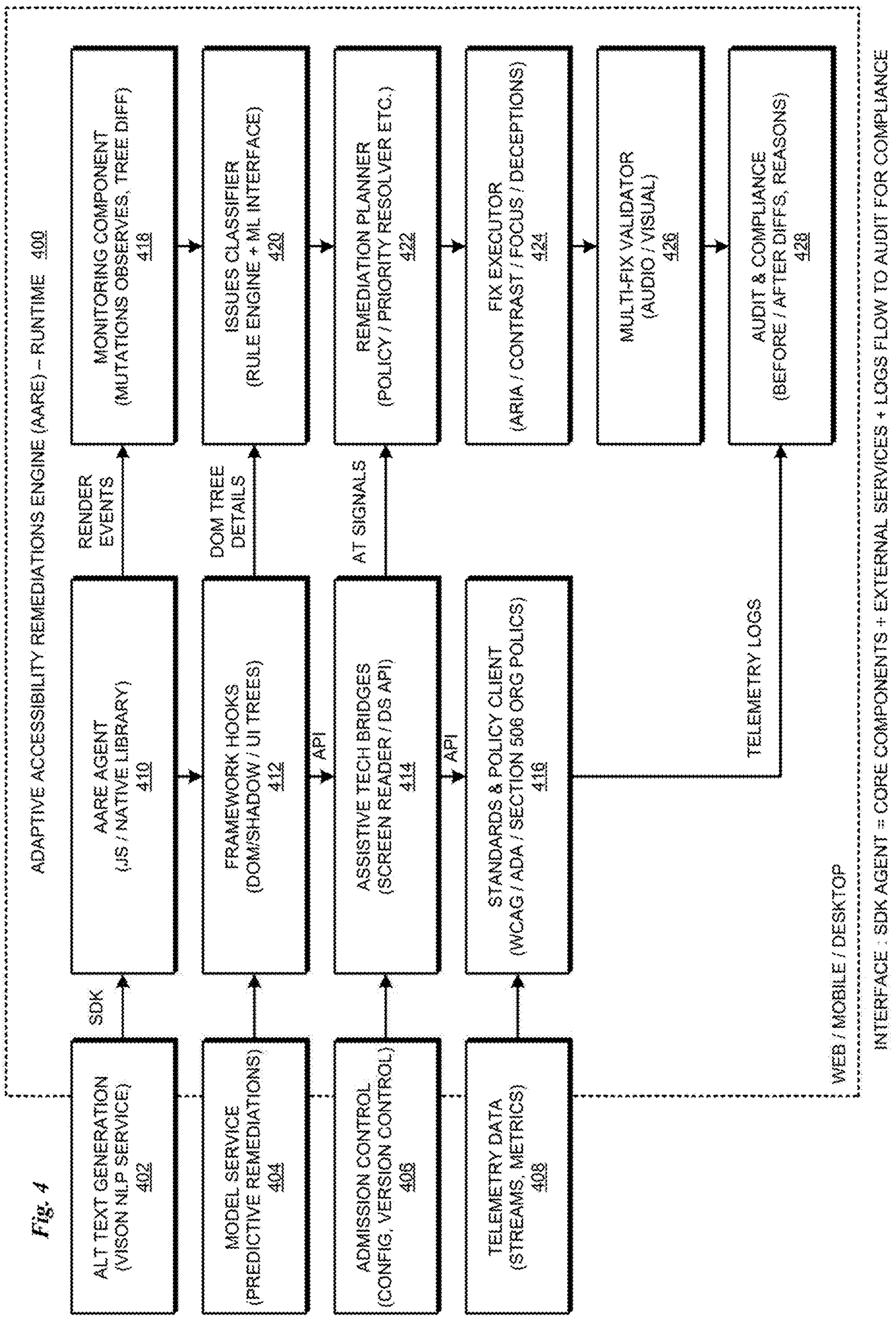
FIG. 4 depicts an AARE runtime configuration in accordance with an illustrative embodiment.

FIG. 4 depicts an AARE runtime configuration in accordance with an illustrative embodiment. AARE 400 (the dotted line block) is an example configuration corresponding to AARE 210 in FIG. 2. AARE 400 can be implemented in a web interface, mobile environment, desktop environment or using a combination thereof, as described herein.

Alt text generation component 402 is an example vision NLP service and interfaces with AARE 400 using AARE agent 410, which in the depicted example is a JS/native library, via SDK. Model service 404 provides predictive remediations and connects through API to AARE 400's framework hooks 412, which in the depicted example are manifested as any of DOM/shadow/UI trees.

Admission control component 406 operates to perform configuration and version control operations on the UI presentation and communicates with one or more assistive tech bridges 414 such as screen reader/DS API using suitable API. Telemetry data collection component 408 can be a part of the environment in which AARE 400 is deployed, which generates a variety of data streams including performance and other measurement metrics, and links to standards and policy client 416 (which is responsible for obtaining and providing accessibility standards and regulations such as WCAG/ADA/Section 506 org policies.

AARE agent (JS/native library) 410 sends render events to monitoring component 418 which is scanning a UI presentation rendering for DOM mutations, tree differences and other changes throughout the presentation of the UI. Monitoring component 418 provides DOM tree details to issues classifier 420, which uses a hybrid rule engine+ML interface configuration as described herein. Issues classifier 420 sends classified issues to remediation planner 422. Remediation planner 422 communicates the recommended and prioritized violation corrections to fix executor 424. Fix executor 424 generates the code and/or accessibility attributes of the violation corrections. The corrections are validated by multi-fix/post-fix validator 426. Validator 426 provides validation results to audit and compliance store 428, and the results may include the before/after differences, reasons for corrections, types of corrections and several other log data items as may be needed for a particular compliance and audit scenario. UI telemetry logs are also sent from telemetry data component 408 to audit and compliance 428 for logging.

Figure 5:
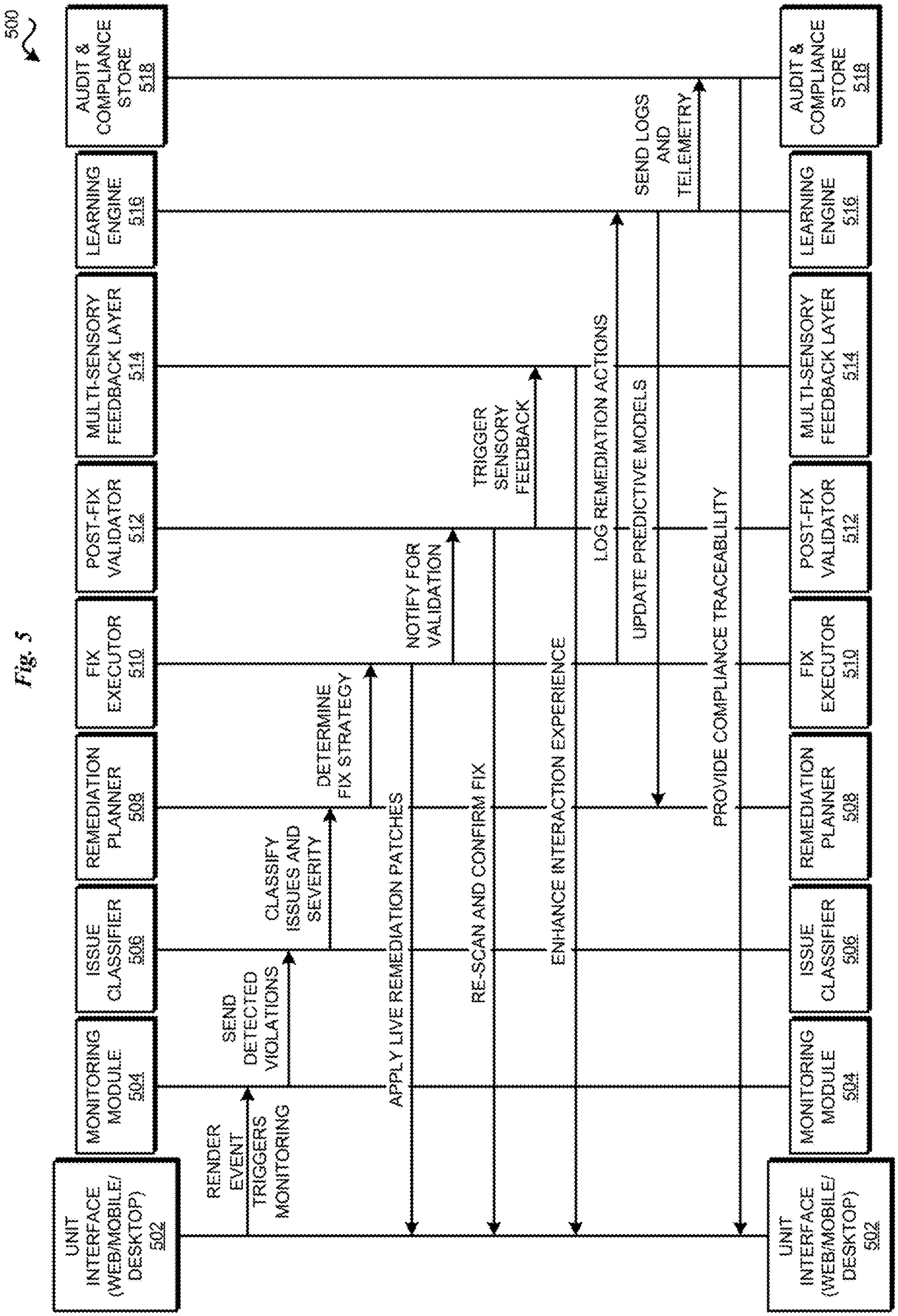
FIG. 5 depicts a process flow for adaptive accessibility remediations in accordance with an illustrative embodiment.

FIG. 5 depicts a process flow for adaptive accessibility remediations in accordance with an illustrative embodiment. Unit interface (web/mobile/desktop) 502 triggers monitoring module 504 with a render event. Monitoring module 504 sends detected violations to issue classifier 506. Issue classifier 506 classifies issues and severity, then sends the information to remediation planner 508. Remediation planner 508 determines a fix strategy and notifies fix executor 510. Fix executor 510 applies the live remediation patches and notifies post-fix validator 512. Post-fix validator 512 re-scans and confirms the fix, then optionally triggers multi-sensory feedback layer 514. Multi-sensory feedback layer 514 enhances interaction experience with additional or supplemental accessibility attributes, and causes the remediation actions to be logged for compliance traceability. Learning engine 516 updates predictive models and also outputs logs of the updates for audit and compliance purposes. Audit and compliance store 518 receives logs and telemetry from learning engine 516 and other components.

Figure 6:
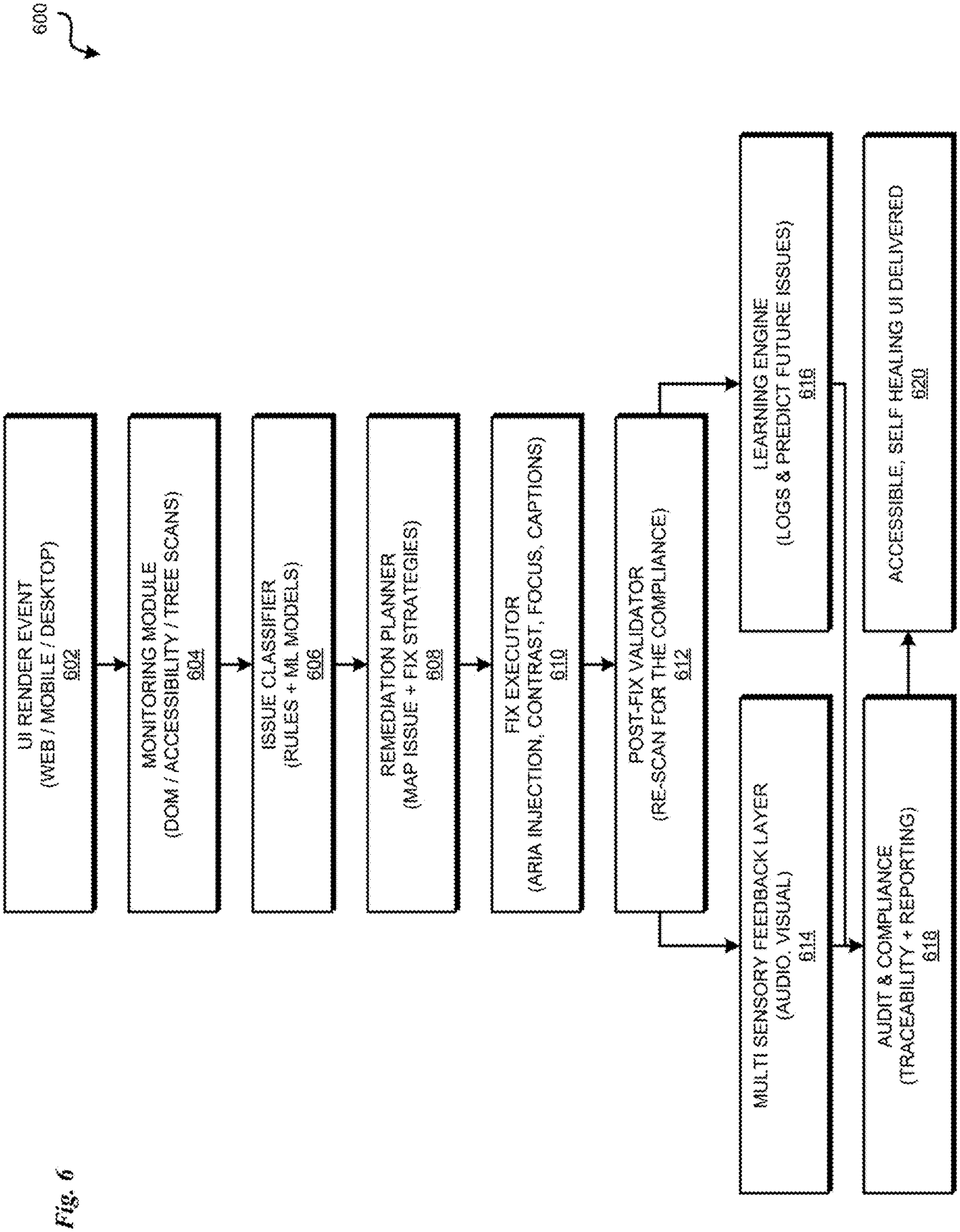
FIG. 6 depicts a process for UI rendering and compliance validation in accordance with an illustrative embodiment.

FIG. 6 depicts a process for UI rendering and compliance validation in accordance with an illustrative embodiment. Process 600 may be implemented in AARE 400 of FIG. 4.

UI Render Event 602 initiates the process by rendering the user interface for web, mobile, or desktop platforms. Monitoring Module 604 scans the Document Object Model (DOM) and checks accessibility and tree structures. Issue Classifier 606 classifies identified issues using rules and machine learning models. Remediation Planner 608 maps the issues and determines appropriate fix strategies. Fix Executor 610 applies fixes such as ARIA injection, contrast adjustments, focus management, and captioning.

Post-Fix Validator 612 re-scans the user interface to ensure compliance with the applied fixes. Multi Sensory Feedback Layer 614 provides audio and visual feedback based on the validation results (Yes path of block 612). Learning Engine 616 logs the validation results and predicts future issues (No path of block 612). Audit & Compliance 618 performs traceability and reporting of the entire process. Accessible, Self-Healing UI Delivered 620 delivers the final user interface with enhanced accessibility and self-healing capabilities. The process ends thereafter.

Figure 7:
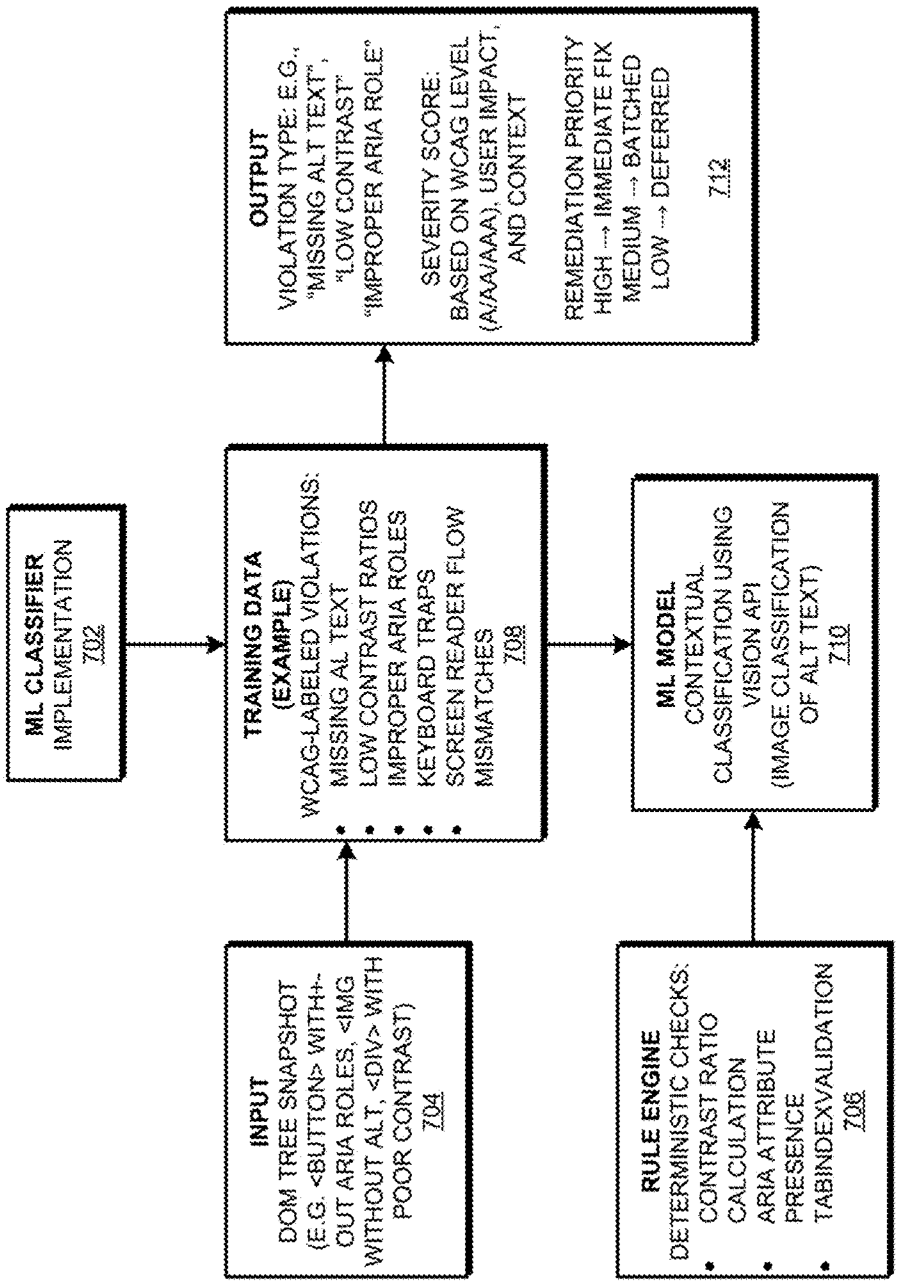
FIG. 7 depicts a block diagram of an example ML classifier implementation in accordance with an illustrative embodiment.

FIG. 7 depicts a block diagram of an example ML classifier implementation in accordance with an illustrative embodiment. In process 700, ML classifier implementation 702 receives input DOM tree snapshot 704. Input DOM tree snapshot 704 includes elements such as buttons without ARIA roles, images without alt text, and divs with poor contrast. ML classifier implementation 702 processes input DOM tree snapshot 704 to generate training data 708. Training data 708 includes WCAG-labeled violations such as missing alt text, low contrast ratios, improper ARIA roles, keyboard traps, and screen reader flow mismatches. Rule engine 706 performs deterministic checks on training data 708. Deterministic checks include contrast ratio calculation, ARIA attribute presence, and tabindex validation, and/or other validations. ML model 710 performs contextual classification using vision API on training data 708. Contextual classification includes image classification of alt text. Output 712 provides violation types such as missing alt text, low contrast, and improper ARIA role. Output 712 also includes severity scores based on WCAG level, user impact, and context. Remediation priority in output 712 is categorized as high for immediate fix, medium for batched, and low for deferred. The process ends thereafter.

Figure 8:
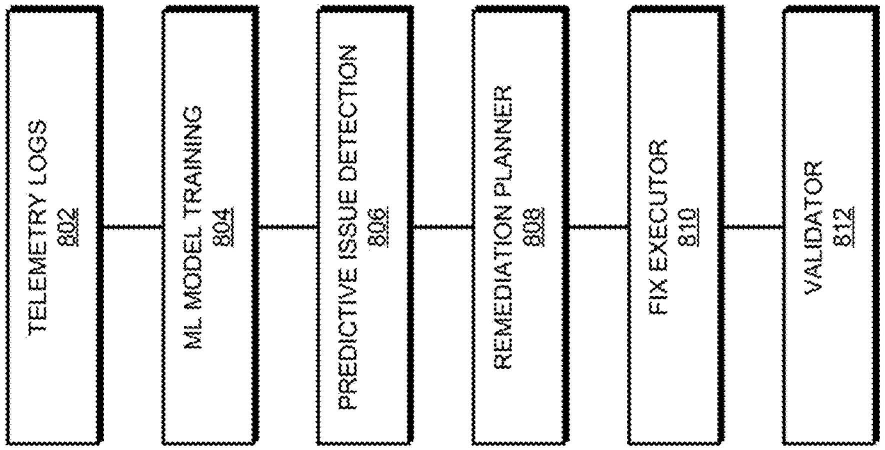
FIG. 8 depicts a flowchart of a predictive remediation workflow in accordance with an illustrative embodiment.

FIG. 8 depicts a flowchart of a predictive remediation workflow in accordance with an illustrative embodiment. Telemetry logs 802 collect data for the process. ML model training 804 uses telemetry logs 802 to train the machine learning model. Predictive issue detection 806 identifies potential issues using the trained model. Remediation planner 808 plans the remediation steps based on detected issues. Fix executor 810 executes the planned remediation steps. Validator 812 validates the executed fixes. The process ends thereafter.

Figure 9:
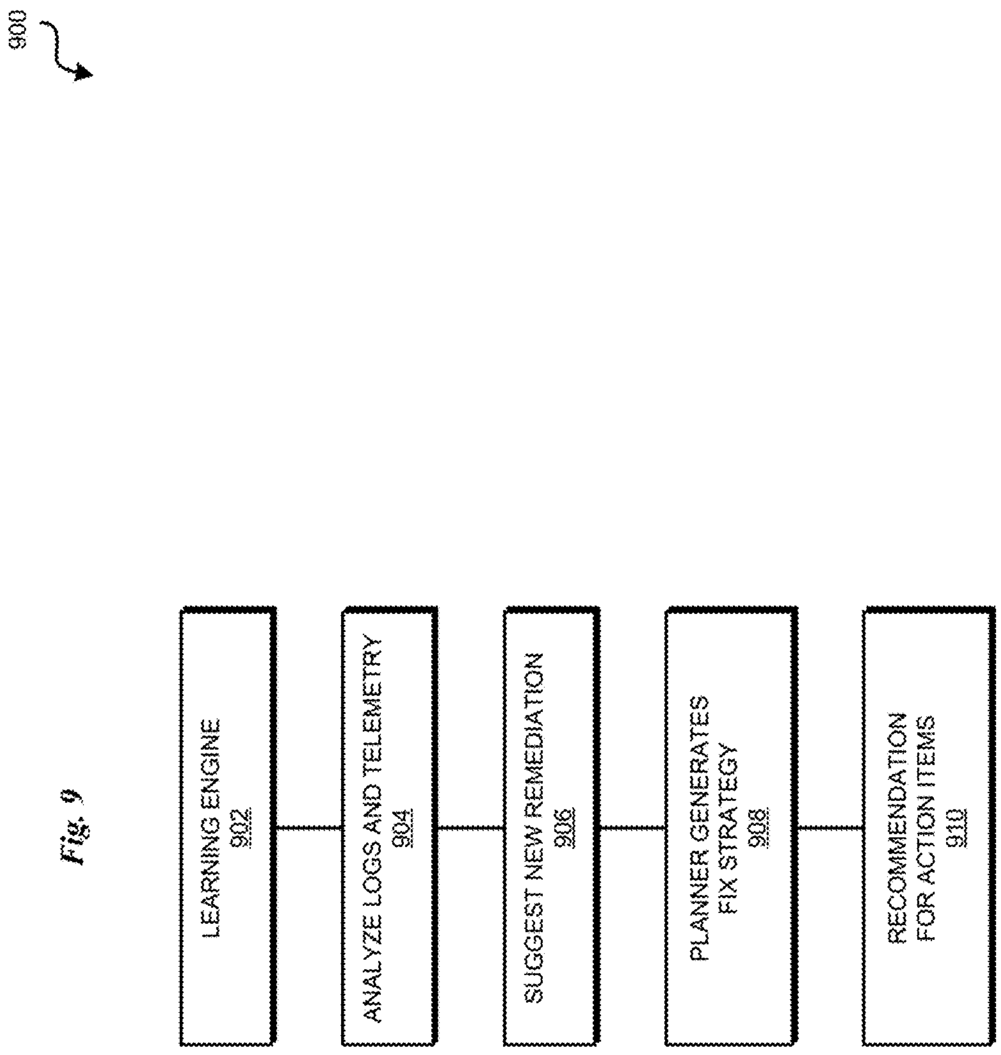
FIG. 9 depicts a flowchart of a strategic remediation workflow in accordance with an illustrative embodiment.

FIG. 9 depicts a flowchart of a strategic remediation workflow in accordance with an illustrative embodiment. In process 900, learning engine 902 initiates the process. In step 904, logs and telemetry are analyzed (e.g., based on examining collected data). In step 906, a new remediation is proposed based on the analysis. In step 908, a planner generates a fix strategy, such as by creating a detailed plan for remediation. In step 910, actionable items based on the fix strategy are provided. The action items can be used to remediate issues. The process ends thereafter.

Figure 10:
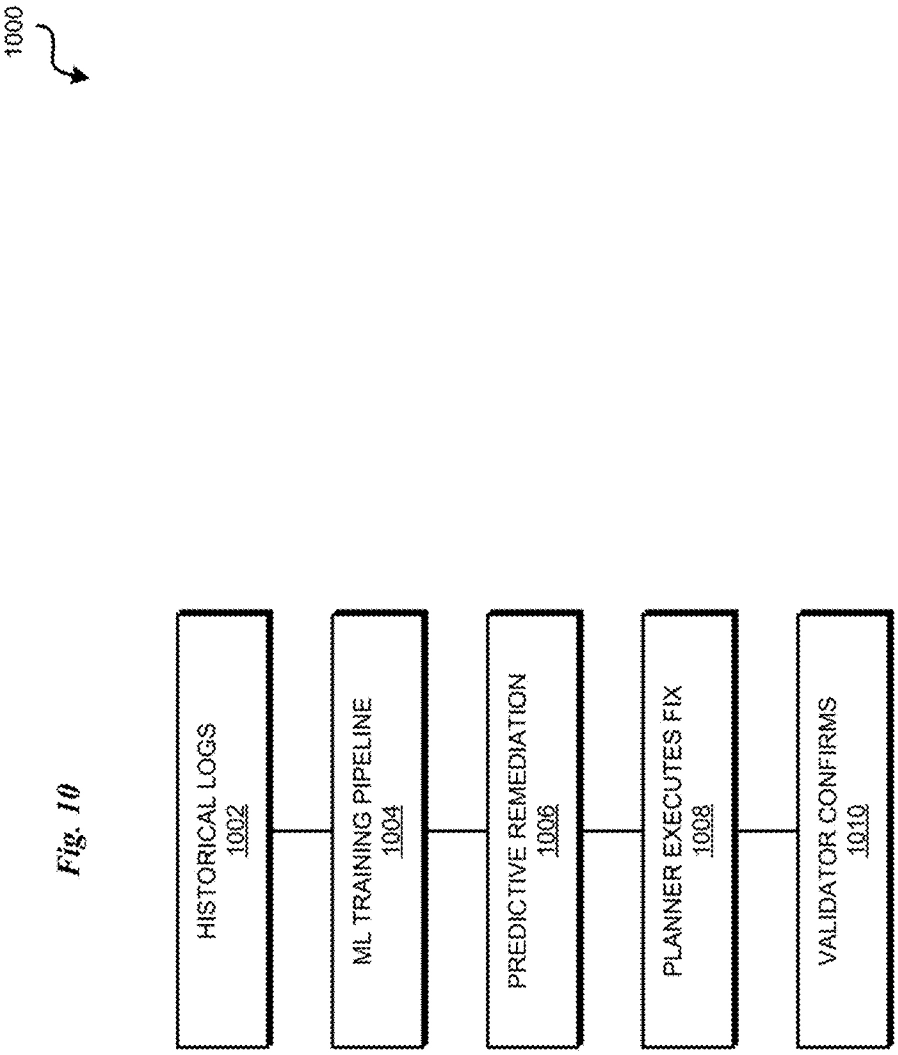
FIG. 10 depicts a flowchart of a historical insight-driven remediation workflow in accordance with an illustrative embodiment.

FIG. 10 depicts a flowchart of a historical insight-driven remediation workflow in accordance with an illustrative embodiment. In process 1000, historical logs 1002 provide past data for analysis. ML training pipeline 1004 uses historical logs 1002 to train the machine learning model. Predictive remediation 1006 identifies potential remediation steps using the trained model. Planner executes fix 1008 carries out the identified remediation steps. Validator confirms 1010 validates the executed fixes. The process ends thereafter.

Figure 11:
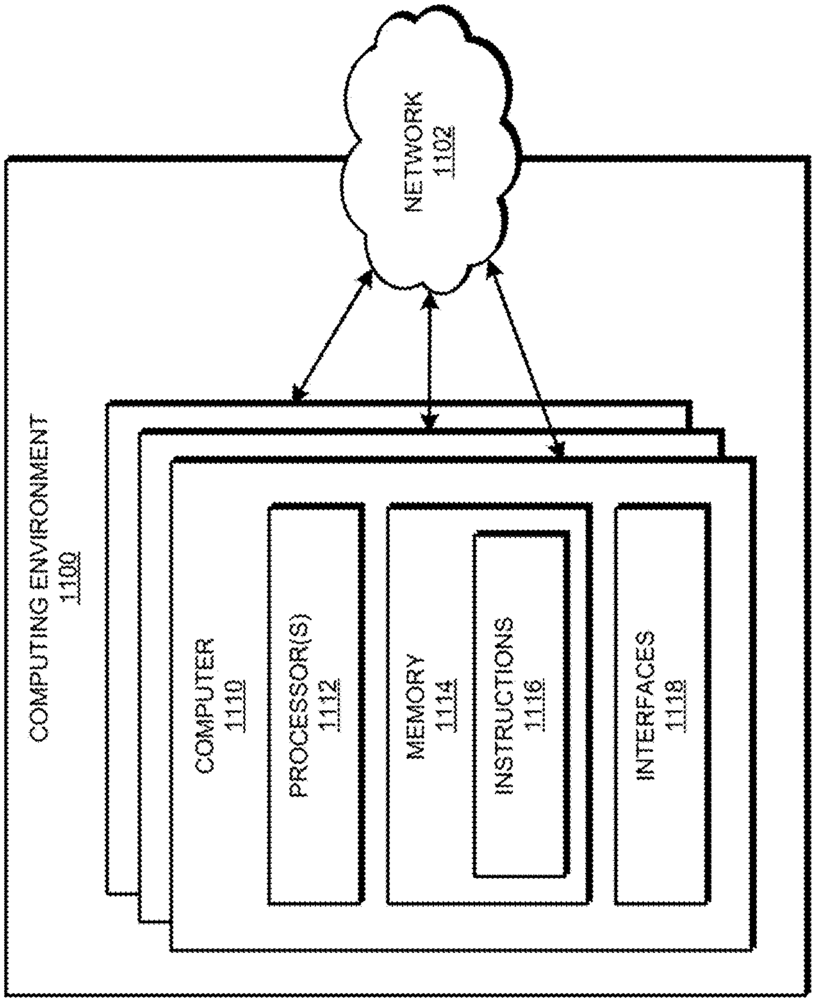
FIG. 11 depicts a data processing environment in which aspects of the present disclosure may be implemented.

FIG. 11 depicts a data processing environment 20 in which aspects of the present disclosure may be implemented. Computing environment 1100 is a set of one or more virtual or physical computers 1110 that individually or in cooperation achieve tasks, such as implementing one or more aspects described herein. Computers 1110 have components that cooperate to cause output based on input. Example computers 1110 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, computing environment 1100 includes at least one physical computer.

Computing environment 1100 may specifically be used to implement one or more aspects described herein. In some examples, one or more of computers 1110 may be implemented as a user device, such as mobile device and others of computers 1110 may be used to implement aspects of a machine learning framework useable to train and deploy models exposed to the mobile device or provide other functionality, such as through exposed application programming interfaces.

Computing environment 1100 can be arranged in any of a variety of ways. Computers 1110 can be local to or remote from other computers 1110 of environment 1100. Computing environment 1100 can include computers 1110 arranged according to client-server models, peer-to-peer models, edge computing models, other models, or combinations thereof.

In many examples, computers 1110 are communicatively coupled with devices internal or external to computing environment 1100 via network 1102. Network 1102 is a set of devices that facilitate communication from a sender to a destination, such as by implementing communication protocols. Example networks 1102 include local area networks, wide area networks, intranets, or the Internet.

In some implementations, computers 1110 can be general-purpose computing devices (e.g., consumer computing devices). In some instances, via hardware or software configuration, computers 1110 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 1110 include one or more processors 1112, memory 1114, and one or more interfaces 1118. Such components can be virtual, physical, or combinations thereof.

The one or more processors 1112 are components that execute instructions, such as instructions that obtain data, process the data, and provide output based on the processing. The one or more processors 1112 often obtain instructions and data stored in memory 1114. The one or more processors 1112 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1112 include at least one physical processor implemented as an electrical circuit. Example providers of processors 1112 include INTEL, AMD, QUALCOMM, TEXAS INSTRUMENTS, and APPLE.

Memory 1114 is a collection of components configured to store instructions 1116 and data for later retrieval and use. Instructions 1116 can, when executed by the one or more processors 1112, cause execution of one or more operations that implement aspects described herein. In many examples, memory 1114 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 1114 can store information encoded in transient signals.

The one or more interfaces 1118 are components that facilitate receiving input from and providing output to something external to computer 1110, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 1118 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 1118 can facilitate connection of computing environment 1100 to network 1190.

Computers 1110 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Figure 12:
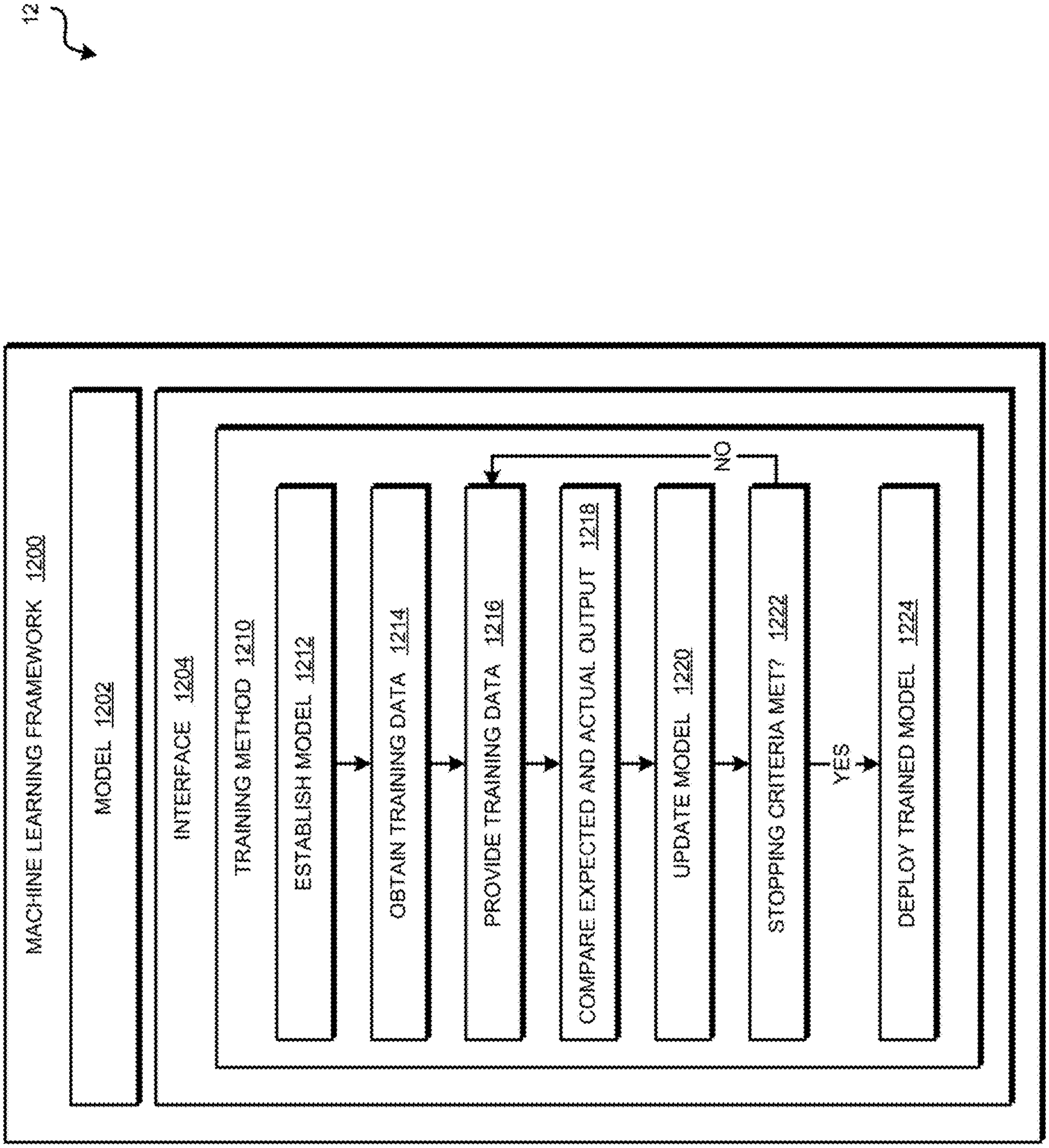
FIG. 12 depicts a configuration for machine learning in which aspects of the present disclosure may be implemented.

FIG. 12 illustrates an example machine learning framework 1200 that techniques described herein may benefit from or improve on. A machine learning framework 1200 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 1200 or components thereof are often built or refined from existing frameworks, such as TENSORFLOW by GOOGLE, INC. or PYTORCH by the PYTORCH community.

The machine learning framework 1200 can include one or more models 1202 that are the structured representation of learning and an interface 1204 that supports use of the model 1202.

The model 1202 can take any of a variety of forms. In many examples, the model 1202 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1202 can include a representation of memory (e.g., providing long short-term memory functionality). Where the set includes more than one model 1202, the models 1202 can be linked, cooperate, or compete to provide output.

The interface 1204 can include software procedures (e.g., defined in a library) that facilitate the use of the model 1202, such as by providing a way to establish and interact with the model 1202. For instance, the software procedures can include software for receiving input, preparing input for use (e.g., by performing vector embedding, such as using Word2Vec, BERT, or another technique), processing the input with the model 1202, providing output, training the model 1202, performing inference with the model 1202, fine tuning the model 1202, other procedures, or combinations thereof.

In an example implementation, interface 1204 can be used to facilitate a training method 1210 that can include operation 1212. Operation 1212 includes establishing a model 1202, such as initializing a model 1202. The establishing can include setting up the model 1202 for further use (e.g., by training or fine tuning). The model 1202 can be initialized with values. In examples, the model 1202 can be pretrained. Operation 1214 can follow operation 1212. Operation 1214 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1202. Operation 1216 can follow operation 1214. Operation 1216 includes providing a portion of the training data to the model 1202. This can include providing the training data in a format usable by the model 1202. The framework 1200 (e.g., via the interface 1204) can cause the model 1202 to produce an output based on the input. Operation 1218 can follow operation 1216. Operation 1218 includes comparing the expected output with the actual output. In an example, this can include applying a loss function to determine the difference between expected and actual. This value can be used to determine how training is progressing. Operation 1220 can follow operation 1218. Operation 1220 includes updating the model 1202 based on the result of the comparison. This can take any of a variety of forms depending on the nature of the model 1202. Where the model 1202 includes weights, the weights can be modified to increase the likelihood that the model 1202 will produce correct output given an input. Depending on the model 1202, backpropagation or other techniques can be used to update the model 1202. Operation 1222 can follow operation 1220. Operation 1222 includes determining whether a stopping criterion has been reached, such as based on the output of the loss function (e.g., actual value or change in value over time). In addition, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1214. If the stopping criterion has been satisfied, the flow can move to operation 1222. Operation 1222 includes deploying the trained model 1202 for use in production, such as providing the trained model 1202 with real-world input data and produce output data used in a real-world process. The model 1202 can be stored in memory 1114 of at least one computer 1110, or distributed across memories of two or more such computers 1110 for production of output data (e.g., predictive data).

In addition to the depicted components of system 10 in FIG. 1, system 10 can also include many other components including, but not limited to—a public cloud, a private cloud, a gateway, a cloud orchestration module, a computer (which may further include specialized processing circuitry, cache, a communication fabric, a volatile memory, a persistent storage including an operating system, and peripheral devices), Internet of Things (IoT) sensors, a remote database, and a container set.

A device contemplated herein may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. Where the detailed discussion in this disclosure is focused on a single computer, such focus is only to keep the presentation as simple as possible. A computer or device contemplated herein may be located in or participate in a cloud, even though it is not shown in a cloud. On the other hand, a computer or device is not required to participate in a cloud except to any extent as may be affirmatively indicated.

A processor device described herein may be of any type now known or to be developed in the future, may be distributed over multiple packages or coordinated integrated circuit chips, and may implement multiple processor threads and/or multiple processor cores. Cache memory may be located in the processor chip package(s) and is typically used for data or code that should be available for rapid access by the threads or cores running on a processor. Cache memories are typically organized into multiple levels depending upon relative proximity to the processing circuitry. Alternatively, some, or all, of the cache for the processor set may be located "off chip." In some computing environments, a processor may be designed for working with qubits and performing quantum computing.

Computer readable program instructions are typically loaded onto a computing device to cause a series of operational steps to be performed by a processor set of the computing device and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache and the other storage media discussed below. The program instructions, and associated data, are accessed by the processor set to control and direct performance of the inventive methods. At least some of the instructions for performing the inventive methods may be stored in a persistent storage.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the embodiments. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment, either locally at a data processing system or over a data network, within the scope of the illustrative embodiments. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment within the scope of the illustrative embodiments. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±9% or 5%, or 2% of a given value.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments each have been described by stating their individual advantages, respectively, present application is not limited to a particular combination thereof. To the contrary, such embodiments may also be combined in any way and number according to the intended deployment of present embodiments without losing their beneficial effects.

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method, comprising:

monitoring a data structure containing a set of elements of a user interface (UI) being rendered on a device in a rendering cycle;

generating, responsive to an element in the set of elements comprising a violation of an accessibility requirement, and by executing a Machine Learning (ML) model trained with a previous corrected data, a classification of the violation;

modifying during the rendering cycle, as a part of applying a remedy corresponding to the classification, data of the element in the data structure in a memory of the device to form a corrected element, the corrected data correcting the violation of the element;

causing the UI to be rendered with the corrected element during the rendering cycle; and recording a log entry corresponding to the modifying, wherein the log entry comprises the data of the element, the classification, and the remedy.

2. The computer-implemented method of claim 1, further comprising:

scanning, subsequent to the modifying, the data structure, the scanning confirming that the corrected element is in compliance with the accessibility requirement.

3. The computer-implemented method of claim 1, further comprising:

scanning, subsequent to the modifying, the data structure, the scanning detecting that the modifying has caused a second element to violate a second accessibility requirement; and triggering a remediation action to correct the second element.

4. The computer-implemented method of claim 1, further comprising:

enhancing the corrected data with an additional accessibility attribute comprising at least one of a generated audio, a generated video, a generated text, and a generated haptic feedback information.

5. The computer-implemented method of claim 1, further comprising:

training the ML model using the element, the corrected element, and the UI as inputs;

executing, subsequent to the training, the ML model relative to a second UI; and outputting from the ML model an indication to correct a second element in the second UI, the indication indicating a second violation of a second accessibility requirement.

6. The computer-implemented method of claim 1, further comprising:

executing, relative to a second element of a second UI, code of a rule-based policy, the code outputting a second classification of a second violation of a second accessibility requirement.

7. The computer-implemented method of claim 1, wherein the monitoring is responsive to detecting a rendering event in the rendering cycle.

8. The computer-implemented method of claim 1, wherein the remedy is selected based on a level of compliance required with the accessibility requirement; further comprising:

foregoing, responsive to the level of compliance, selecting a second remedy corresponding to a second violation detected in a second element of the UI.

9. The computer-implemented method of claim 1, further comprising:

detecting, in a second rendering cycle of the UI, a change made to the data structure by a rendering environment code on the device;

triggering during the second rendering cycle, a remediation action responsive to the change introducing a second violation in a second element in the data structure; and causing the UI to be rendered with a corrected second element during the second rendering cycle.

10. A computer program product comprising one or more computer readable storage media, and program instructions collectively stored on the one or more computer readable storage media, the program instructions executable by a set of one or more processors to cause the set of one or more processors to perform operations comprising:

monitoring a data structure containing a set of elements of a user interface (UI) being rendered on a device in a rendering cycle;

generating, responsive to an element in the set of elements comprising a violation of an accessibility requirement, and by executing a Machine Learning (ML) model trained with a previous corrected data, a classification of the violation;

modifying during the rendering cycle, as a part of applying a remedy corresponding to the classification, data of the element in the data structure in a memory of the device to form a corrected element, the corrected data correcting the violation of the element;

causing the UI to be rendered with the corrected element during the rendering cycle; and recording a log entry corresponding to the modifying, wherein the log entry comprises the data of the element, the classification, and the remedy.

11. The computer program product of claim 10, the operations further comprising:

scanning, subsequent to the modifying, the data structure, the scanning confirming that the corrected element is in compliance with the accessibility requirement.

12. The computer program product of claim 10, the operations further comprising:

scanning, subsequent to the modifying, the data structure, the scanning detecting that the modifying has caused a second element to violate a second accessibility requirement; and triggering a remediation action to correct the second element.

13. The computer program product of claim 10, the operations further comprising:

enhancing the corrected data with additional accessibility attribute comprising at least one of a generated audio, a generated video, a generated text, and a generated haptic feedback information.

14. The computer program product of claim 10, the operations further comprising:

training the ML model using the element, the corrected element, and the UI as inputs;

executing, subsequent to the training, the ML model relative to a second UI; and outputting from the ML model an indication to correct a second element in the second UI, the indication indicating a second violation of a second accessibility requirement.

15. The computer program product of claim 10, the operations further comprising:

executing, relative to a second element of a second UI, code of a rule-based policy, the code outputting a second classification of a second violation of a second accessibility requirement.

16. The computer program product of claim 10, wherein the stored program instructions are stored in a computer readable storage device in a data processing system, and wherein the stored program instructions are transferred over a network from a remote data processing system.

17. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, the operations further comprising:

metering a use of the program instructions associated with the request; and generating an invoice based on the use.

18. A computer system comprising a set of one or more processors and one or more computer readable storage media, and program instructions collectively stored on the one or more computer readable storage media, the program instructions executable by the set of one or more processors to cause the processor to perform operations comprising:

monitoring a data structure containing a set of elements of a user interface (UI) being rendered on a device in a rendering cycle;

generating, responsive to an element in the set of elements comprising a violation of an accessibility requirement, and by executing a Machine Learning (ML) model trained with a previous corrected data, a classification of the violation;

modifying during the rendering cycle, as a part of applying a remedy corresponding to the classification, data of the element in the data structure in a memory of the device to form a corrected element, the corrected data correcting the violation of the element;

causing the UI to be rendered with the corrected element during the rendering cycle; and recording a log entry corresponding to the modifying, wherein the log entry comprises the data of the element, the classification, and the remedy.

* * * * *